United States Patent [19]

Flandermeyer et al.

[11] Patent Number: 4,749,632
[45] Date of Patent: Jun. 7, 1988

[54] SINTERING AID FOR LANTHANUM CHROMITE REFRACTORIES

[75] Inventors: Brian K. Flandermeyer, Bolingbrook; Roger B. Poeppel, Glen Ellyn; Joseph T. Dusek, Downers Grove, all of Ill.; Harlan U. Anderson, Rolla, Mo.

[73] Assignee: The United States of America as represented by the United States Department of Energy, Washington, D.C.

[21] Appl. No.: 922,429

[22] Filed: Oct. 23, 1986

[51] Int. Cl.⁴ .................. H01M 8/00; C04B 35/05
[52] U.S. Cl. .................................. 429/12; 429/33; 501/152
[58] Field of Search .............. 429/12, 33, 32; 501/87, 501/88, 152

[56] References Cited

U.S. PATENT DOCUMENTS

| | | | |
|---|---|---|---|
| 4,054,627 | 10/1977 | Ownby | 264/65 |
| 4,146,379 | 3/1979 | Copley et al. | 501/88 X |
| 4,332,904 | 6/1982 | Nishida et al. | 501/88 X |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,477,541 | 10/1984 | Fraioli | 429/33 |
| 4,510,212 | 4/1985 | Fraioli | 429/30 |

Primary Examiner—Brian E. Hearn
Assistant Examiner—Stephen J. Kalafut
Attorney, Agent, or Firm—Emrich & Dithmar

[57] ABSTRACT

An electronically conductive interconnect layer for use in a fuel cell or other electrolytic device is formed with sintering additives to permit densification in a monolithic structure with the electrode materials. Additions including an oxide of boron and a eutectic forming composition of Group 2A metal fluorides with Group 3B metal fluorides and Group 2A metal oxides with Group 6B metal oxides lower the required firing temperature of lanthanum chromite to permit densification to in excess of 94% of theoretical density without degradation of electrode material lamina. The monolithic structure is formed by tape casting thin layers of electrode, interconnect and electrolyte materials and sintering the green lamina together under common densification conditions.

15 Claims, 3 Drawing Sheets

SINTERING AID FOR LANTHANUM CHROMITE REFRACTORIES

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

The present invention relates to solid electrolytic cells of monolithic structure and more particularly to sintering methods and sintering aids for forming such monolithic structures.

Fuel cells and other electrolytic cells that do not include liquid electrolyte have been the subject of considerable study. Representative of this technology are U.S. Pat. Nos. 4,476,198 to Ackerman et al.; 4,476,197 to Herceg; 4,476,196 to Poeppel et al.; and 4,510,212 to Fraioli, wherein each relate to certain aspects of solid oxide fuel cells or electrolytic production cells.

As is described in several of the above cited patents, monolithic electrolytic cells include two general wall types defining passageways for reactant gases. One wall includes a dense layer of $(Zr, Y)O_2$ electrolyte interposed between two porous electrode layers. This electrolyte wall permits only $O^{2-}$ ions to flow when a gradient in oxygen pressure is applied, generating the desired electrical current. The second wall type includes an electronically conductive, interconnect material between electrode layers of opposite polarity, each electrode layer being of a distinct but adjacent cell. It is to this second type wall that the present invention is addressed in particular.

Lanthanum chromite ($LaCrO_3$) is a refractory of considerable interest for use in interconnect layers or monolithic fuel cell stacks. This electrically conductive refractory may also have a value as a heating element in a high temperature furnace.

Formidable problems have arisen in fabricating a monolithic structure with many thin layers of different ceramic materials. The thin, frangible layers are not easily formed and assembled into an operable structure. An assembly of green layers requires similar firing characteristics for the various ceramic materials employed. This has been of particular consequence in respect to the interconnection material, lanthanum chromite. This material will densify only at temperatures above 1900° K. under reducing conditions making it incompatable with fabrication techniques suitable for prospective electrode and electrolyte materials.

SUMMARY OF THE INVENTION

Therefore, in view of the above, it is an object of the present invention to provide an improved method for forming lamina including an electrically conductive lanthanum chromite layer.

It is also an object to provide sintering aids for lanthanum chromite to permit densification at reduced temperatures.

It is also an object of the invention to provide a method of forming a laminated interconnect wall for densification at a single sintering temperature.

It is a further object of the invention to provide lamina of green ceramic material suitable for densification by sintering.

In accordance with the present invention, a method is provided for forming an electronically conductive, interconnection layer including lanthanum chromite. The method comprises depositing a layer of particulate lanthanum chromite containing a minor fraction of a sintering aid having a melting point substantially below the melting point of lanthanum chromite. The layer is sintered at a sufficiently high temperture of not more than 1800° K. to effect densification to more than 90%, preferably at least 94% theoretical density.

In the more specific aspects of the invention, the sintering aid includes an oxide of boron.

In another aspect of the invention, the sintering aid includes a eutectic affording composition of at least two components which composition provides a minor liquid phase in the layer at a temperature below 1600° K.

In a further aspect of the invention, the eutectic affording composition is selected from the class of compositions including Group 2A-metal fluorides with Group 3B-metal fluorides, and Group 2A-metal oxides with Group 6B-metal oxides.

In another more specific aspect of the invention, the eutectic affording composition canb e selected from $YF_3CaF_2$, $YF_3$-$MgF_2$, $LaF_3$-$CaF_2$, $LaF_3$-$MgF_2$ and $CaO$-$Cr_2O_3$.

In one other specific aspect, the sintering aid includes the combination of an oxide of boron with a eutectic affording composition, which composition provides a minor liquid phase at a temperature below 1600° K.

In one other specific aspect, the oxide of boron is selected from the lanthanum borates, yttrium borates, boric acid or boron oxide.

The invention also comprehends a method of forming an electrolytic composite suitable for use as an interconnection wall between series connected electrolytic cells. The method includes providing a layer of first electrode material including an electrochemical catalyst, depositing on the first layer a layer of particulate lanthanum chromite with a sintering aid including an oxide of boron and a eutectic affording composition selected from the class of compositions consisting of metal compounds capable of providing a liquid phase at temperatures below 1600° K., the metal compounds are selected from groups 2A, 3B and 6B metals combined with anions selected from the oxides and fluorides. A layer of second electrode material is deposited on the lanthanum chromite layer to form a three-layered structure, which structure is sintered at a temperature of 1400°-1800° K. to bond the layers into an integral lamination having an electronically conductive lanthanum chromite layer interconnecting the layers of first and second electrode materials.

In other aspects of the invention, each of the green layers are deposited by tape-casting techniques from a slip of particulate material, solvent, and polymeric binder selected to be driven off as vapor in the sintering step.

The present invention also contemplates a green laminated structure suitable for sintering at a temperature below 1800° K. to form an integral three-layered wall for use as an interconnection between series connected electrolytic cells. The lamination includes a first layer of lanthanum-manganite with strontium doping as cathode material, a second layer containing lanthanum chromite and a sintering aid, the sintering aid includes an oxide of boron combined with a eutectic-affording composition selected from the fluorides and the oxides of the group 2A, group 3B and group 6B metals. The third layer in the lamination contains a cermet of a transition metal and stabilized zirconia for use as anode material.

A BRIEF DESCRIPTION OF THE DRAWINGS

The present invention is illustrated in the accompanying drawings wherein.

DETAILED DESCRIPTION OF THE PREFERRED EMBODIMENT

Figure 1:
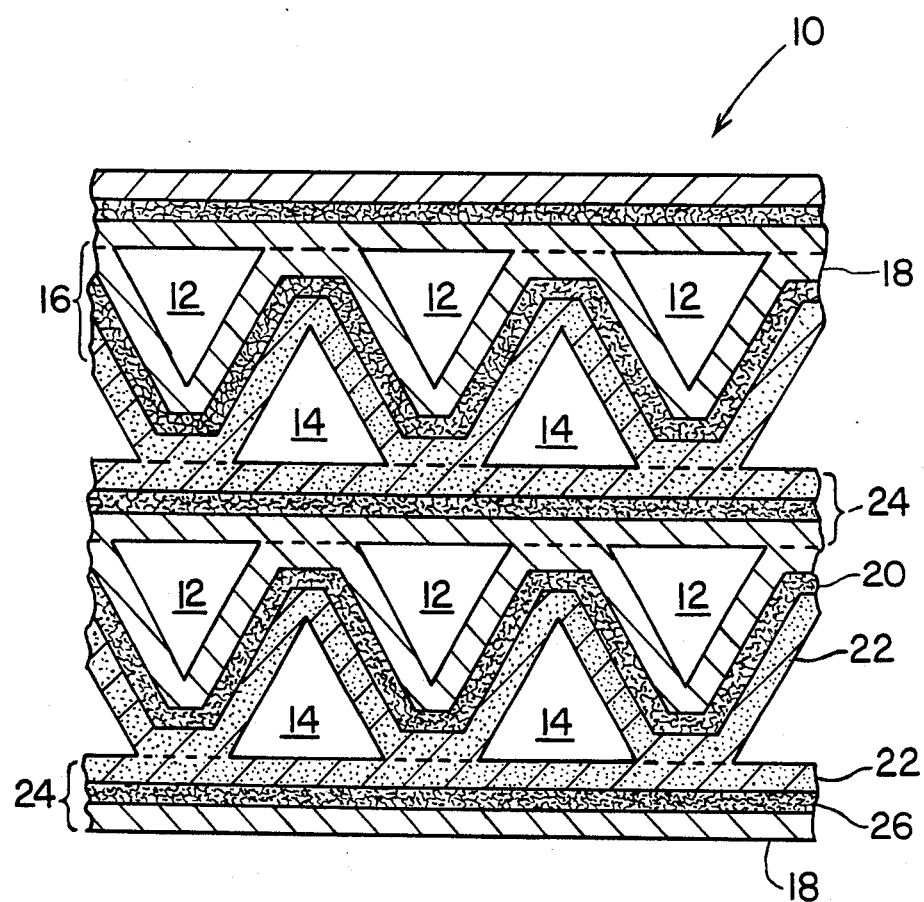
FIG. 1 is a generally schematic cross section of a fuel cell fragment.

In FIG. 1, a fuel cell with solid oxide electrolyte is illustrated. The fuel cell comprises a monolithic core 10 including a repeating stack of component layers defining passageways 12, for fuel flow, and passageways 14, for oxidant flow. Although, there are a number of arrangements in which the monolithic core can be constructed, the core illustrated in FIG. 1 is generally similar to that more fully described in U.S. Pat. No. 4,476,198 to Ackerman et al. cited above. In this solid oxide fuel cell core arrangement, an undulating wall 16 including an anode 18, an electrolyte layer 20, and a cathode 22 define the passageways 14 in which all of the walls are of cathode material and passageways 12 in which all of the walls are of anode material.

These undulating walls with passageways for fuel and oxidant gases each define one fuel cell segment and are separated from adjacent fuel cell segments by interconnecting wall 24. The interconnecting wall 24 includes three layers, one of cathode material 22, an intermediate layer of interconnect material 26, and a third layer of anode material 18. As is seen in FIG. 1, the oxidant gas, e.g. air in passageways 14 contacts only the cathode material 22 and the fuel gas, e.g. hydrogen, contacts only the anode material 18 in the course of the electrolytic reaction.

Although the present invention is particularly described in terms of preparing the interconnect wall of a monolithic fuel cell core, it will be clear that various other applications may incorporate the teachings of the invention. Electrolysis cells for the decomposition of water and the production of hydrogen or oxygen gases can be provided in accordance with the invention. Other electrolytic cells and devices for storing or generating electrical energy or for the separation or electrolysis of various other materials also may be provided with the procedures described herein.

In a solid oxide fuel cell core, a typical cathode or air electrode can be formed of lanthanum manganite doped with about one part strontium to nine parts lanthanum ($La_{0.9}Sr_{0.1}MnO_3$). The electrolyte can comprise yttria-stabilized zirconia ($ZrO_2+Y_2O_3$) and the fuel anode can be a nickel and yttria-stabilized zirconia cermet ($Ni+ZrO_2, Y_2O_3$) or an equivalent mixture. In such a fuel cell, the interconnect material can be of lanthanum chromite ($LaCrO_3$) with dopant of magnesium, calcium, iron, nickel or combinations thereof to improve electrical conductivity.

The interconnect material 26 of the solid oxide fuel cell core must be sufficiently dense to prevent cross leakage of the reactant gases and to form a strong bond to both the anode and cathode. Typically densities in excess of 90%, preferably 94% of theoretical are to be attained. The inventors have found that in order to attain such high densities, unmodified lanthanum chromite must be fired or sintered at temperatures in excess of 1900° K. in a hydrogen atmosphere. At these conditions considerable damage or distortion occurs to the other cell components. Interdiffusion of the cell components can become significant at such extreme conditions to destroy the desired electrolytic properties. Moreover, the lanthanum manganite cathode would decompose to the component oxides in hydrogen atmosphere at these temperatures.

The inventors recognize lanthanum chromite as a desirable material for use in the interconnect layers. It exhibits compatible thermal expansion, good electrical conductivity and is chemically compatible with the electrode materials. For this purpose, they have discovered a method for densifying the interconnect layer in lamina with other cell components.

The inventors have found that by using certain sintering aids in the lanthanum chromite layer, that densification can occur at substantially lower temperatures, e.g. temperatures below 1800° K. The sintering additives may include an oxide of boron and/or an eutectic affording composition selected from the oxides and fluorides of the Groups 2A, 3B and 6B metals. A representative periodic table defining these metals is given in the HANDBOOK OF CHEMISTRY AND PHYSICS, 52nd Edition, B-3 (Chemical Rubber Co., 1971–1972). Preferred additives include boron oxide ($B_2O_3$), boric acid ($H_3BO_3$), eutectic affording compositions such as yttrium fluoride and magnesium fluoride ($YF_3$-$MgF_2$), lanthanum fluoride-calcium fluoride ($LaF_3$-$CaF_2$), lanthanum fluoride-magnesium fluoride ($LaF_3$-$MgF_2$), yttrium fluoride-calcium fluoride ($YF_3$-$CaF_2$) and calcium oxide-chromium oxide ($CaO$-$Cr_2O_3$). Although it is preferred that the eutectic composition be provided, compositions near i.e. within 5% by weight of the eutectic also may be used such that melting and solidifying procedures will afford the low melting eutectic composition in phase equilibrium with other solid components.

Oxides of boron such as boron oxide, or boric acid, are expected to react in situ with the interconnect materials to form lanthanum borates or yttrium borates. The inventors have found that these additives alone or in combination with the above described eutectic affording compositions promote densification of the interconnect layer. Moreover, the lanthanum borates or yttrium borates may be directly added to the interconnect materials during preparation of the layer.

Figure 2:
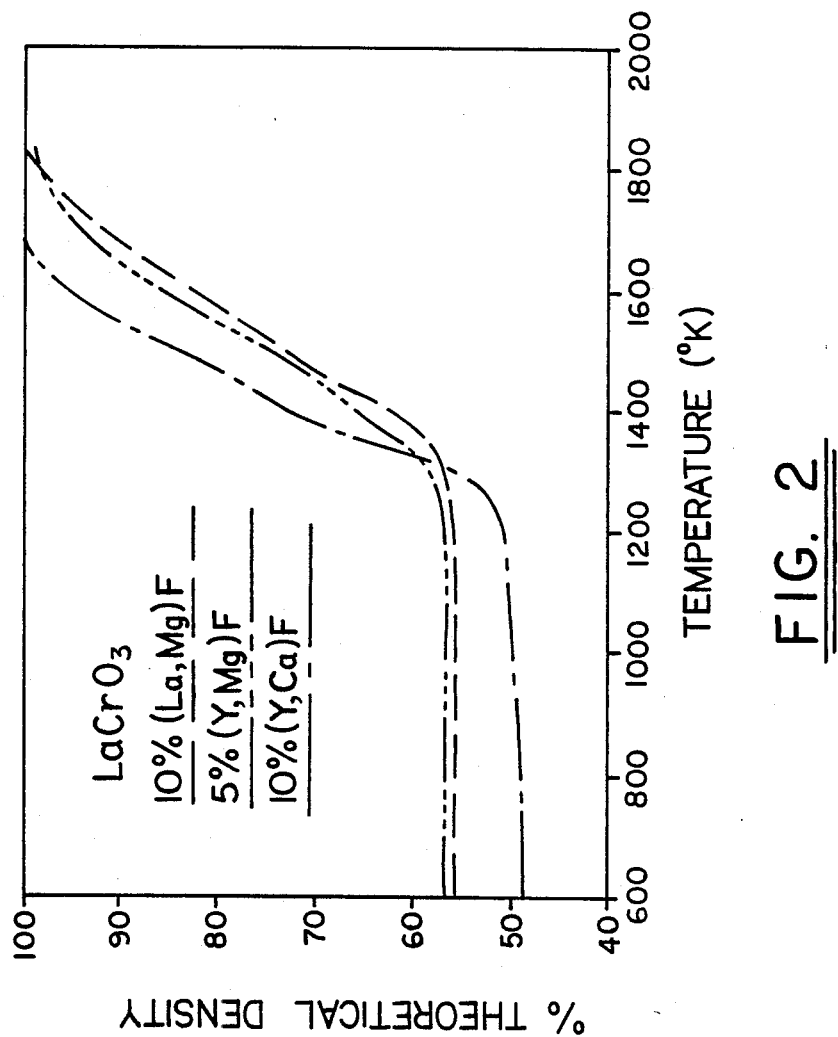
FIG. 2 is a graph of percent theoretical density versus firing temperature for several fluoride sintering aids in $LaCrO_3$.

In FIG. 2, the substantial reduction is densification temperatures for systems including 5 to 10 weight % metal fluorides in a lanthanum chromite layer are illustrated. Curves representing 10 weight % (La,Mg)F, 5 weight % (Y,Mg)F and 10 weight % (Y,Ca)F are included. Although, firing temperatures of 1700° K. provide in excess of 90% theoretical density, these elevated temperatures tend to drive off or decompose the fluoride sintering aids.

Figure 3:
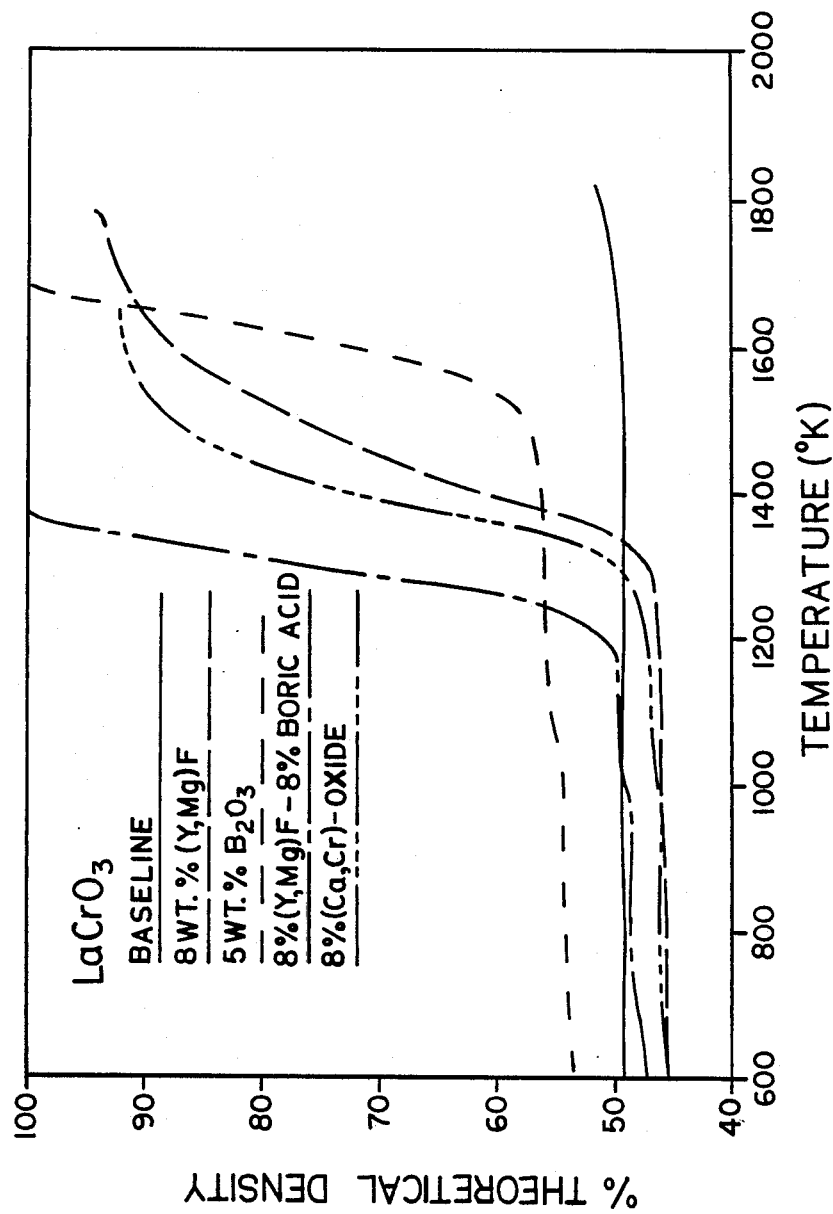
FIG. 3 is a graph of percent theoretical density versus firing temperature for $LaCr_{0.9}Mg_{0.1}O_3$ with various sintering aids.

FIG. 3 provides comparative data showing substantial improvement in densification at sintered temperatures as low at 1300° K. when both an oxide of boron and a fluoride additive are included in the lanthanum chromite layer. Boron oxide or boric acid alone acts as a good sintering aid for $LaCrO_3$ but requires a greater firing temperature than the $F^-$-$B_2O_3$ system, or the $CaO$-$Cr_2O_3$-$B_2O_3$ system. The inventors find that the oxide of boron additive retains the fluoride in the interconnect layer until substantial densification occurs at a temperature well below 1600° K. It is expected that at least 2 weight percent boric acid or other boron oxide is needed to retain the fluoride sintering aid and that compositions in excess of 15 weight percent would detract from the lanthanum chromite effectiveness as an interconnect material.

In addition to the fluoride sintering additives, a combination of oxides from the Group 2A and Group 6B metal oxides can be used to form an eutectic affording composition. For instance, about 2 to 15% $CaO-Cr_2O_3$ eutectic can be added to the lanthanum chromite to obtain a substantial reduction in densification temperatures. This system also is illustrated in FIG. 3 along with a magnesium-doped lanthanum chromite designated as baseline material.

The inventors have found that an oxide of boron additive is particularly advantageous in combination with $CaO-Cr_2O_3$ eutectic to prevent migration of the eutectic to the electrode layers during sintering.

In one manner of carrying out the present invention, lanthanum and chromium nitrate solutions can be prepared and calcined to oxide. Fluoride ions can be added as HF to the nitrate solution. The resulting powders can be attrition milled and mixed with a suitable polymeric binder, spray-dried to reduce agglomeration and obtain a fine powder suitable for slurrying with a solvent to form a slip for tape casting. The sintering aid in powdered form can be added to the tape-casting slip prior to casting onto a substrate of previously cast electrode material. Subsequently, a slip of electrode material of opposite polarity can be cast onto the lanthanum chormite layer. Intermediate layers formulated as blends of the two adjoining layers can be added as necessary to enhance bonding between layers or to relieve thermal expansion stresses. The layered structure including the lanthanum chormite and sintering aid is fired at a temperature of no more than 1800° K. to fire the electrode materials while densifying the lanthanum chromite interconnect material to a high density, preferably in excess of 94% of theoretical.

The following examples are provided merely to illustrate various aspects of the invention.

EXAMPLE I

A mixed oxide power, of stoichiometric proportions $LaCr_{0.9}Mg_{0.1}O_3$ and 10% by weight boric acid powder are slurried with Cerbind/methylene chloride, methylethylketone (TAM Cermics, Inc.) to form a slip for tape casting. The tape is cast on a substrate and fired at 1600° K. to form an integral, electrically conductive layer of more than 94% theoretical density.

EXAMPLE II

The slip of Example I is prepared but with 6% $B_2O_3$, 8% (Ca,Cr) oxide, by weight, and the remainder of $LaCr_{0.9}-Mg_{0.1}O_3$ in solvent. The slip is cast between a green cathode layer of $La_{0.9}Sr_{0.1}MnO_3$ and anode layer of cobalt and yttriastabilized zirconia cermet. The green composite is fired at 1500° K. to form an integral three-layered interconnect layer of more than 90% of theoretical density.

EXAMPLE III

The slip of Example II is prepared except that 8% by weight (La, Mg)$F_2$ is substituted for the (Ca, Cr) Oxide. Firing at 1400° K. provides an interconnect layer in excess of 94% theoretical density.

EXAMPLE IV

The procedure of the above Examples is used except that Lanthanum borate ($LaBO_3$) and yttria borate ($YBO_3$) are added to the slip as oxide of boron sintering acid.

Although, the present invention has been described in terms of specific materials and procedures, it will be clear to one skilled in the art that various modifications in the materials, components, and structures can be made by one skilled in the art within the scope of the accompanying claims.

The embodiments of this invention in which an exclusive property or privilege is claimed are defined as follows:

1. A method of forming an electronically conductive, integral layer including lanthanum chromite comprising: depositing a layer including particulate lanthanum chromite containing a minor fraction of a sintering aid which includes a eutectic affording composition of at least two components providing a minor portion of a liquid phase in said layer during the sintering step, said eutectic affording composition having a melting point substantially below the melting point of said lanthanum chromite; sintering said layer at a sufficiently high temperature of not more than 1800° K. to form and densify an integral layer including lanthanum chromite.

2. The method of claim 1 wherein said sintering aid includes an oxide of boron.

3. The method of claim 1 wherein said eutectic affording composition is selected from the class consisting of metals from Groups 2A, 3B, and 6B combined with anions selected from the oxides and fluorides.

4. The method of claim 1 wherein said eutectic affording composition is selected from the class consisting of $YF_3-CaF_2$, $YF_3-MgF_2$, $LaF_3-CaF_2$, $LaF_3-MgF_2$, and $CaO-Cr_2O_3$.

5. The method of claim 2 wherein said oxide of boron is selected from the group consisting of lanthanum borates, yttrium borates, boron oxide and boric acid and wherein said eutectic affording composition is selected from the class consisting of metals from Groups 2A, 3B, and 6B combined with anions selected from the oxides and fluorides.

6. The method of claim 2 wherein said oxide of boron is selected from the class consisting of lanthanum borates, yttrium borates, boron oxide and boric acid and wherein said eutectic affording composition is selected from the class consisting of $YF_3-CaF_2$, $YF_3-MgF_2$, $LaF_3-CaF_2$, $LaF_3-MgF_2$, and $CaO-Cr_2O_3$.

7. The method of claim 6 wherein said layer of lanthanum chromite and sintering aid is deposited on a substrate of cathodic material including lanthanum manganate followed by depositing a superstrate of anodic material including transition metal, zirconia cermet to form a green composite lamina and said lamina is sintered at not more than 1700° K. to form an integral three layered structure with said layer of lanthanum chromite of more than 94% theoretical density.

8. The method of claim 1 wherein said sintering aid is present at a level of at least 2 weight percent in respect to the lanthanum chromite.

9. A method of forming an electrolytic composite suitable for use as an interconnection layer between series connected solid oxide cells comprising:
providing a layer of first electrode material including an electrochemical catalyst, depositing on said layer of first electrode material, a layer including particulate lanthanum chromite with a sintering aid including an oxide of boron and a eutectic affording composition, said eutectic affording composition selected from the class of eutectic affording systems consisting of metal compounds capable of providing a liquid phase at temperatures below 1600° K., said class of metal compounds consisting of metals from Groups 2A, 3B, and 6B combined with anions selected from the oxides and fluorides, said eutectic affording composition including at least two components, and providing a minor portion of a liquid phrase in said layer including particulate lanthanum chromite during sintering;

depositing a layer of second electrode material on said lanthanum chromite layer to form a three-layered structure;

sintering said structure at a temperature of 1400°-1700° K. to bond said layers into an integral lamination having an electronically conductive, lanthanum chormite layer interconnecting said layer of first electrode material to said layer of second electrode material.

10. The method of claim 9 wherein said first electrode material includes an anodic material including a cermet of a transition metal with stabilized zirconia and wherein said second electrode material includes strontium-doped lanthanum manganate as cathode material.

11. The method of claim 9 wherein said oxide of boron is selected from the group consisting of lanthanum borates, yttrium borates, boric acid and boron oxide.

12. The method of claim 9 wherein said eutectic affording composition is selected from the class consisting of $YF_3$-$CaF_2$, $YF_3$-$MgF_2$, $LaF_3$-$CaF_2$, $LaF_3MgF_2$, and $CaO$-$Cr_2O_3$.

13. The method of claim 9 wherein said oxide of boron and said eutectic affording composition each are included in said lanthanum chromite containing layer at a concentration of at least 2% by weight.

14. The method of claim 9 wherein each of said layers is deposited by tape casting a slip of particulate material, solvent and polymeric binder, wherein said solvent and polymeric binder is driven off as vapor in said sintering step.

15. A lamination suitable for sintering at a temperature below 1700° K. to form an integral three-layered wall for use as an interconnection between series connected solid oxide fuel cells, said lamination comprising:

a first layer including lanthanum manganite;

a second layer containing lanthanum chromite and a sintering aid, said sintering aid including an oxide of boron combined with a eutectic affording composition selected from the fluorides and the oxides of the Group 2A, Group 3B and Group 6B metals, said eutectic affording composition including at least two components, and providing a minor portion of a liquid phase in said second layer during sintering; and a third layer containing a cermet of a transition metal and stabilized zirconia.

* * * * *